United States Patent [19]

Melman et al.

[11] Patent Number: 4,786,140
[45] Date of Patent: Nov. 22, 1988

[54] METHOD OF MODULATING LARGE-POWER LIGHT BEAMS USING FIBER RAMAN AMPLIFICATION

[75] Inventors: Paul Melman, Newton; Mark L. Dakss, Sudbury, both of Mass.

[73] Assignee: GTE Laboratories Incorporated, Waltham, Mass.

[21] Appl. No.: 114,938

[22] Filed: Oct. 30, 1987

[51] Int. Cl.$^4$ .............................................. G02F 1/35
[52] U.S. Cl. ................................. 350/96.29; 350/96.15
[58] Field of Search .......................... 350/96.15, 96.29

[56] References Cited

U.S. PATENT DOCUMENTS 4,401,364 8/1983 Mochizuki ........................ 350/96.16
4,616,898 10/1986 Hicks, Jr. ...................... 350/96.16 X Primary Examiner—John D. Lee
Assistant Examiner—Phan Heartney
Attorney, Agent, or Firm—James J. Cannon, Jr.

[57] ABSTRACT

Fast modulation on a low-power laser beam is transferred to a high-power beam when the high-power beam pumps to depletion the amplification of the low-power beam in a fiber Raman amplifier.

6 Claims, 2 Drawing Sheets

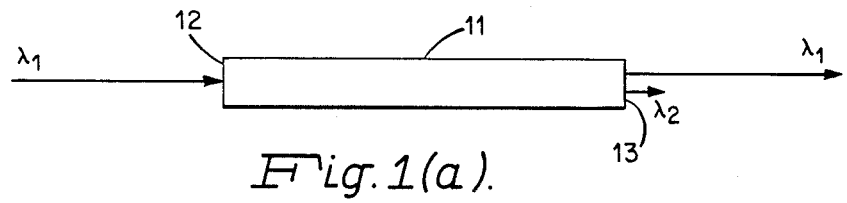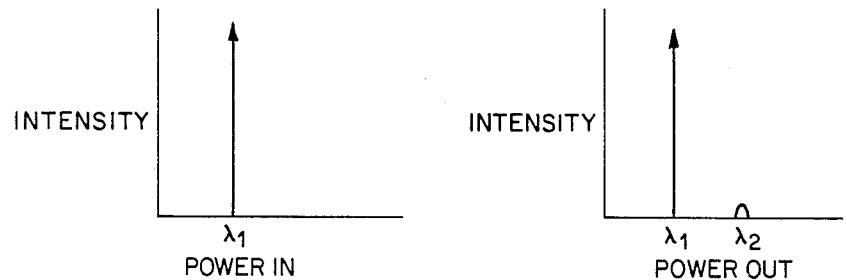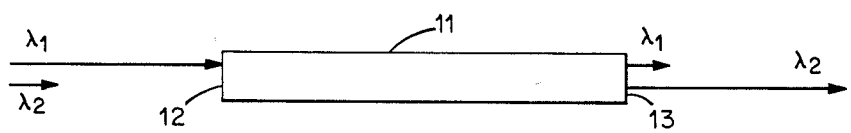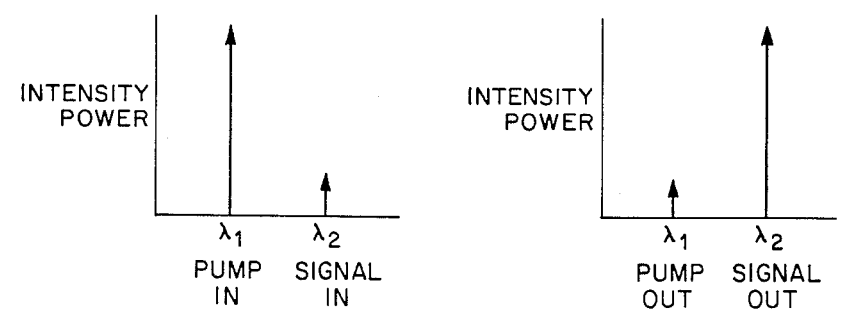

METHOD OF MODULATING LARGE-POWER LIGHT BEAMS USING FIBER RAMAN AMPLIFICATION

BACKGROUND OF THE INVENTION

1. Field of the Invention

This invention relates to methods of modulating large-power light beams using fiber Raman amplification, especially for the fast modulation thereof. Accordingly, it is a general object of this invention to provide new and improved methods of such character.

2. General Background

The Raman effect is defined by the American Heritage Dictionary of the English Language, 1969, as: physics. The alteration in frequency and random alteration in phase of light scattered in a material medium. [Discovered by Sir Chandrasekhara Zenkata *Raman* (born 1888), Indian physicist.]

Long-distance light transmission in optical fibers is often limited by loss therein, a result in part of the limited power available from the light sources that are typically used, i.e., diode lasers. Light amplification by stimulated Raman scattering in fibers has been proposed as a technique for amplifying light back up to usable levels and experimental studies demonstrating gains exceeding 20 dB have been reported by Y. Aoki et al., "Efficient backward and forward pumping cw amplification for InGaAs laser light in silica fibers", Electronics Lett., 19, 1983, p. 620. However, Raman amplification has been limited by the lack of sufficiently powerful pump sources in that several hundreds of mW to one watt is required to be coupled into a fiber at approximately one Raman Stokes Shift, i.e., 450 cm$^{-1}$ in inverse wavelength units, above the signal wavelength. For example, a non-existent pump source with several hundred mW to one watt at 1.24μm is required for a signal wavelength of 1.3μm.

An alternative method of long distance light transmission in optical fibers uses a large-power (hundreds of mW to 1W) laser such as a 1.32 μm YAG laser as a communications signal source to overcome the fiber loss problem. An external modulator for the laser, however, is required that is capable of handling the involved optical powers and modulating same at high enough speed e.g., hundreds of MHz to GHz. Of the prior art modulators, the optical powers involved dictated the use of bulk, rather than guided-wave, modulators. For broadband applications, electro-optic types are desirable but require substantial drive powers. This can be seen from the figure of merit (corresponding to full amplitude modulation, i.e., an electro-optic retardation of $\pi$ radians), representing the drive power per unit bandwidth, at best about 10 mW/MHz as reported by I. P. Kaminow and T. Li, "Modulation Techniques", Optical Fiber Telecommunications, S. Miller and S. Chynoweth, eds. (New York, Academic Press, 1979), chapt. 17, p. 569. For modulation at 1 GHz, then, a very impractical 10W drive is required.

OBJECTS AND ADVANTAGES OF THE INVENTION

Another object of this invention is to provide a new and improved method of modulation that utilizes much smaller drive powers than bulk external modulators, can handle the high optical powers involved, and can be utilized directly in the communications optical fiber.

Still another object of this invention is to provide a new and improved modulation method that utilizes a high-power beam as a pump for amplification of a lower-power beam on which a signal has been modulated.

Yet another object of this invention is to provide a method as said forth hereinabove in which the lower-power beam is obtainable from a directly modulated diode laser or from a cw diode laser externally modulated by a thin film waveguide modulator.

Still yet another object of this invention is to provide a new and improved modulation method wherein amplification is performed in a fiber which is sufficiently long that pump depletion occurs.

Advantageously with this invention, when in the pump-depletion region, whenever the low-power beam has a pulse ("1" state), the high-power beam becomes depleted and shows a "0", while the low-power beam's nonpulse ("0") state yields no depletion and hence a "1" in the high-power beam. Thus, information on the easily modulated lower-power beam is transferred to the higher-power beam. The high-power beam and the low-power beam should propogate down the fiber in the same direction.

SUMMARY OF THE INVENTION

In accordance with one aspect of this invention, a method of modulating a continuous-wave large-power light beam with Raman amplification includes a plurality of steps. It includes providing a length of low-loss optical fiber which has an input end and an output end. It further includes applying the large-power light beam (at a pump wavelength $\lambda_1$) to the input end of the optical fiber. Thereby, the output end of the optical fiber normally provides a first continuous-wave output beam at the pump wavelength $\lambda_1$ and a second output beam at a wavelength $\lambda_2$. The intensity of the first output beam is much higher than the intensity of the second output beam. Further, the large-power light beam at the pump wavelength $\lambda_1$ is applied to the input end of the optical fiber and, simultaneously, a weak modulated optical signal at the wavelength $\lambda_2$ is applied to the input end of the optical fiber. As a result, the optical fiber, at its output end, provides a significantly modulated large-power light beam at the pump wavelength $\lambda_1$.

In accordance with certain features of the invention, the method further includes amplifying the modulation of the large-power light beam by varying the length of the optical fiber. The low-loss optical fiber can be glass; it can be constructed of fused quartz with a germanium-doped core. The amplification is caused by stimulated Raman scattering, wherein $1/\lambda_1 - 1/\lambda_2 = 450$ cm$^{-1}$.

In accordance with another aspect of the invention, a method of modulating a large-power light beam with Raman amplification includes the step of providing a length of low-loss optical fiber having an input and an output end. A light beam is applied at a pump wavelength $\lambda_1$ to the input end of the optical fiber of such an intensity that the output end of the fiber provides a first output beam at the pump wavelength $\lambda_1$ and a second output beam at a wavelength $\lambda_2$. The intensity of the first output beam is much higher than the intensity of the second output beam. Then, a weak modulated optical signal at the wavelength $\lambda_2$ is applied to the input end of the optical fiber. Thus, the optical fiber, at the output end, provides a significantly modulated large-power light beam at the pump wavelength $\lambda_1$ by depletion.

BRIEF DESCRIPTION OF THE DRAWING

Other objects, advantages, and features of this invention, together with its mode of operation, will become more apparent from the following description, when read in conjunction with the accompanying drawing, in which:

FIG. 1(a) is a diagram of an optical fiber having a pump at wavelength applied at an input end thereof;

FIG. 1(b) is a power-intensity/wavelength diagram showing the power applied at the wavelength $\lambda_1$ to the input end of the optical fiber;

FIG. 1(c) is a power-intensity/wavelength diagram illustrating the powers at the wavelengths and $\lambda_1$ and $\lambda_2$ that are emitted from the output end of the optical fiber;

FIG. 2(a) is a diagram illustrating an optical fiber to which a pump at the wavelength $\lambda_1$ is applied to the input end of the optical fiber together with a signal at the wavelength $\lambda_2$ applied to that end;

FIG. 2(b) is a power-intensity/wavelength diagram illustrating the pump at the wavelength $\lambda_1$ and a signal $\lambda_2$ applied to the input end of the optical fiber;

FIG. 2(c) is a power-intensity/wavelength diagram illustrating the output obtained from the optical fiber at the wavelengths $\lambda_1$ and $\lambda_2$.

DESCRIPTION OF THE PREFERRED EMBODIMENT(S)

Modulation of a high-power beam via Raman amplification is obtainable. A signal impressed on a low-power beam at a wavelength $\lambda_2$ such as that from a directly-modulated diode laser (not shown) is injected into a fiber 11 (preferably single-mode) at an input end thereof, together with a continuous-wave higher-power beam $\lambda_1$ as indicated at FIGS. 2(a) and 2(b). The cw higher-power beam at wavelength $\lambda_1$ and the signal beam at wavelength $\lambda_2$ propagate together, with the high-power beam acting as a pump for Raman amplification of the lower-power signal beam. Ideally, the wavelength of the low-power beam should be selected to be approximately one Raman Stokes Shift above that of the high-power beam, as indicated earlier.

Initially, as indicated in FIGS. 1(a) and 1(b), a cw high-power beam at wavelength $\lambda_1$ is applied to the input end 12 of the optical fiber 11. The optical fiber 11 provides several outputs at its end 13, one output of which is a slightly attenuated beam at the wavelength $\lambda_1$, together with a smaller output beam at the wavelength $\lambda_2$.

As indicated in FIG. 1(b), the input beam $\lambda_1$ has a substantial intensity. No input is applied at the wavelength $\lambda_2$. As indicated in FIG. 1(c), the power out from the optical fiber 11 is a slightly attenuated high-power beam at the wavelength $\lambda_1$ and a small output at the wavelength $\lambda_2$ due to amplified spontaneous Raman scattering.

In accordance with the invention, a high-power beam at the wavelength $\lambda_1$ is applied to the input end 12 of the optical fiber 11, as indicated in FIG. 2(a), together with a small signal at the wavelength $\lambda_2$ as indicated in FIGS. 2(a) and 2(b). The wavelength $\lambda_2$ is greater than the wavelength $\lambda_1$. The power in the beam of wavelength $\lambda_2$ should be greater than the background spontaneous Raman scattering (at least several microwatts). The pulses in the lower-power beam at $\lambda_1$, applied to the input end 12 of the fiber 11, get amplified steadily until they reach such an amplitude that the pump gets depleted. The depletion, as indicated in FIGS. 2(a) and 2(c), produces the inverse of the signal beams modulation on the higherpower beam. Thus, the fiber 11 produces at the output end 13 (as depicted in FIGS. 2(a) and 2(c)) an amplified signal at the wavelength $\lambda_2$ and a modulated pump signal at the wavelength $\lambda_1$. Depletion is strong, yielding a rise to a correspondingly strong depth of modulation.

Figure 3A:
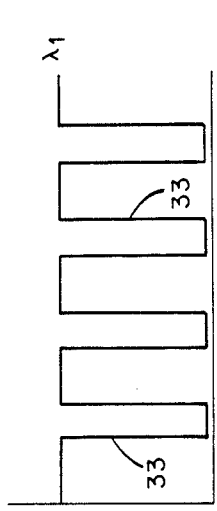
FIG. 3(a) is a power-intensity/time diagram showing the continuous-wave pump together with a signal input to be applied to an optical fiber.
Figure 3B:
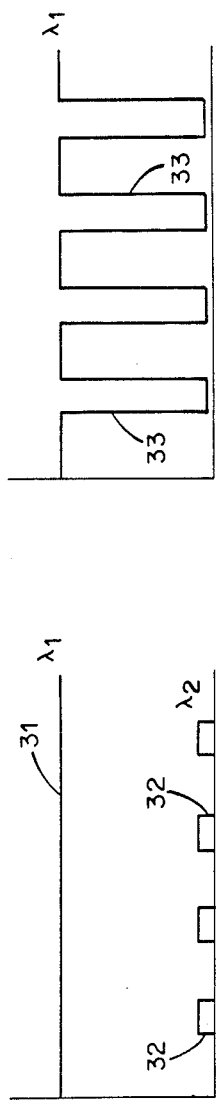
FIG. 3(b) is a diagram illustrating the output of the modulated pump (the amplified signal is not shown for clarity of illustration)

FIG. 3(a) depicts the magnitude of a high-power cw pump beam 31 to be applied to the input end 12 of the optical fiber 11 together with a modulated weak signal input 32 which is applied thereto. As indicated in FIG. 3(a), the signal 32 consists of a series of low intensity pulses. The pump 31 and the signal input 32 undergo transformation due to stimulated Raman scattering or Raman amplification within the fiber 11 whereby the pump 31 is depleted by the signal at the wavelength $\lambda_2$, and the pump produces a large output from the output end 13 of the optical fiber 11 when the signal input is nil but produces a substantially lower output when the signal input is positive. Thus, as depicted in FIG. 3(b), the pump signal at the wavelength $\lambda_1$ has an envelope at the same level as that of the input of the pump when the signal applied to the input end 12 is nil, but produces sharp negative going pulses 33—33 when the signal pulses 32—32 are present.

The modulation of a large-power light beam herein uses a modulation drive power that is merely sufficient to modulate the lower-power signal beam. For a directly-modulated diode laser, this is independent of the bandwidth as long as the bandwidth does not exceed that of the diode laser which, for properly designed lasers, can exceed 15 GHz, according to a private communication by a co-worker C. B. Su. The drive power for this modulation can be estimated. Diode lasers are available with 10–20 mA threshold currents and modulation currents of about 10 mA. The power dissipation in the laser, assuming a 2 volt drop, is then 20 mW and another 10 mW is lost in a 50 ohm load resistor. At a 1 GHz repetition rate, this is a reduction factor of $3 \times 10^2$ in drive power from that of the bulk modulator, and the reduction is even larger at higher frequencies.

When direct modulation of the light source for the low-power signal beam is not desired (e.g., because of associated frequency chirp) or not possible, the low-power signal beam can be externally modulated through the use of guided-wave modulators, which require much smaller drive powers than bulk modulators. The figure of merit for the guided-wave modulators can be better than 1μ W/MHz and these guided-wave modulators are capable of speeds exceeding 10 GHz, according to S. K. Korotky et al., "4 Gb/s transmission experiment over 11 km of optical fiber using a Ti:LiNbO$_3$ external modulator", Optical Fiber Commun. Conf. (OFC '85), San Diego, CA, 1985, paper PD01; T. Sueta and M. Izutsu, "High-speed guided-wave optical modulators", J. Opt. Commun. 3, 1982, p.5.

The Raman amplification process has a very fast response time (in the order of picoseconds) and does not therefore form a speed limitation. Probably, the most important speed limitation is dispersion in the fiber 11, viz, the difference between the group velocity of the high- and the low-power beams, which ultimately causes the two beams to become out of step, thus degrading the quality of the modulation of the high-power one. For typical dispersion-unshifted single-mode fiber, the difference in propagation times between the beams, assumed at 1.3 and 1.4 $\mu$m wavelengths, is below 0.5 nsec per km of fiber. As the slippage of one beam with respect to the other should be less than 1/(4R), where R is the repetition rate, then the length L of fiber must be less than 1/4R$\xi$, where $\xi$ is the slippage time per km. For R=1 GHz, and $\xi$=0.5 nsec/km (the figure given above), L must be less than about 0.5 km. From the results indicated by the Y. Aoki et al. reference cited above, assuming a 1.5W power for the higher-power beam and 10 mW for the lower-power beam, and a fiber loss of 0.5 dB/km at the higher-power beam's wavelength, a length of about 3 km is required for depletion. Thus, the dispersion limitation implies a maximum of about 180 MHz. When higher rates are required and larger pump powers are not available, then fibers with more equal group velocities at the two wavelengths can be used. For example, in the above situation, a fiber dispersion-shifted to about 1.35 microns or having a flattened dispersion (both shifted and flattened fibers are well within the prior art) would be useful. Alternatively, fibers with enhanced Raman gain would shorten the required length and thereby ease the bandwidth restriction.

Raman modulation can be used to modulate high-power light beams for applications other than fiber optic communications, e.g., for atmospheric communications or for transmission of microwave-modulated light beams for use in radars and the like. Fibers with special dopants can be used to permit specific combinations of low-power and high-power beam wavelengths. Other nonlinear effects than stimulated Raman scattering are usable.

Figure 4:
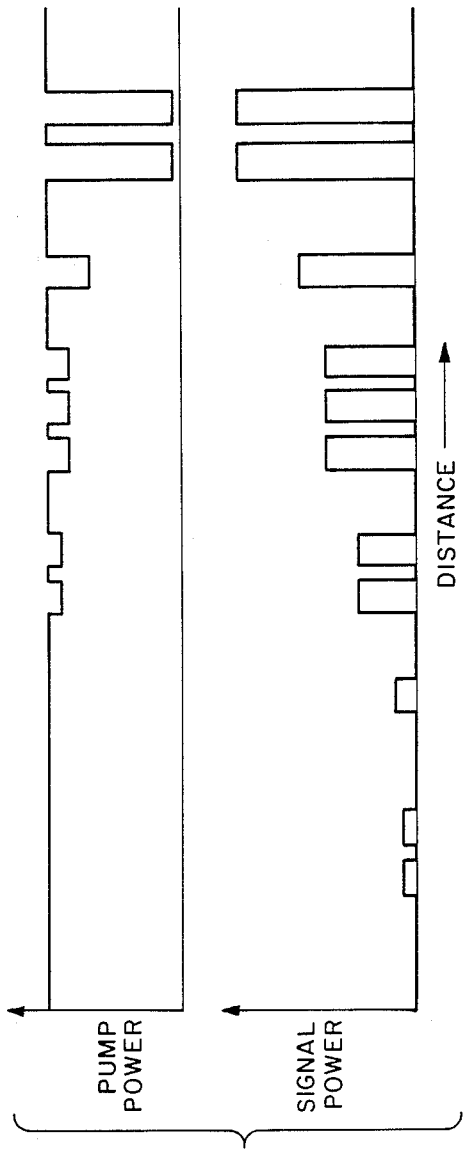
FIG. 4 illustrates the pump-power versus distance and signal power versus distance, that are obtained from the output end of the optical fiber.

FIG. 4 includes a pair of charts: one illustrates pump power versus distance, and the other indicates signal power versus distance. Note that as distances vary, the degree of amplification of pump power varies. Hence, with both pump power at a significantly high level applied to the optical fiber and signal power applied to the optical fiber, the output thereof, i.e., the pump power, is depleted at varying degrees depending upon the distance or length of the optical fiber.

Thus, we emphasize the use of stimulated Raman scattering to transfer the modulation of a low-power laser beam onto a high-power beam when the higher-power beam is the pump and the lower-power beam is amplified to the point of depleting the pump. The high-power beam that is fast-modulated by this method forms an alternative source for fiber optical communications.

CONCLUSION

In summary, a light beam (at the wavelength $\lambda_1$) which is very strong is applied to the input end 12 of an optical fiber 11, whereby at the output end 13 thereof two beams are emitted, one comparatively strong beam at the wavelength $\lambda_1$ and a weaker second beam at the wavelength $\lambda_2$ which is at a lower frequency.

The optimum difference in frequencies (determined by the property of the glass) can be calculated via the expression $1/\lambda_1 - 1/\lambda_2 = 450$ inverse centimeters.

With no input signal at the wavelength $\lambda_2$ present, a pump (at the wavelength $\lambda_1$) is applied to the input end 12 of the optical fiber 11. An output beam at the wavelength $\lambda_1$ is obtained together with a weaker beam at the wavelength $\lambda_2$ from the output end 13 of the fiber 11. The weak beam at the wavelength $\lambda_2$ can be deleted by way of a limiting means.

By applying a separate signal beam at the wavelength $\lambda_2$ to the input end 12 of the fiber 11 together with a pump beam at the wavelength $\lambda_1$ thereto, the output end 13 of the glass fiber 11 provides a beam at the wavelength $\lambda_1$ and an amplified beam at the wavelength $\lambda_2$. This amplification is caused by stimulated Raman scattering.

The Raman pump is inserted at a comparatively high intensity and a signal is inserted at a comparatively low intensity. The power from the pump is depleted and the power is transferred to the signal which is amplified. As they proceed through a long fiber 11, the pump is depleted and the amplitude of the signal is increased. Thus, at the output end 13 of the fiber 11 the pump bean is now modulated.

At the input of the fiber 11, the intensity of the pump is substantially greater than the intensity of the signal, perhaps 100 times greater. At the output of the glass fiber, the modulation of the low-power beam has been transferred to a strong modulation on one high-power beam.

The longer the fiber, the greater the amplification due to stimulated Raman scattering.

Hence, in effect, the weak signal at the wavelength $\lambda_2$ modulates the strong pump at the wavelength $\lambda_1$.

Various modifications will suggest themselves to those skilled in the art to which the invention pertains without departing from the spirit and scope of the invention.

What is claimed is:

1. A method of modulating a continuous-wave large-power light beam with Raman amplification comprising the steps of providing a length of low-loss optical fiber having an input end and an output end;

applying said large-power light beam at a pump wavelength $\lambda_1$ to said input end of said optical fiber, whereby said output end of said fiber normally provides a first continuous-wave output beam at said pump wavelength $\lambda_1$ and a second output beam at a wavelength $\lambda_2$, where the intensity of said first output beam is much higher than the intensity of said second output beam; and then, applying said large-power light beam at said pump wavelength $\lambda_1$ to said input end of said optical fiber, and applying a weak modulated optical signal at said wavelength $\lambda_2$ to said input end of said optical fiber, whereby said optical fiber, at said output end, provides a significantly modulated large-power light beam at said pump wavelength $\lambda_1$.

2. The method as recited in claim 1 further including amplification of modulation of said large-power light beam comprising the step of varying said length of said optical fiber.

3. The method as recited in claim 1 wherein said low-loss optical fiber is glass.

4. The method as recited in claim 1 wherein said low-loss optical fiber is constructed of fused quartz with a germanium-doped core.

5. The method as recited in claim 1 wherein $$1/\lambda_1 - 1/\lambda_2 = 450 \text{ cm}^{-1}.$$

6. A method of modulating a large-power light beam with Raman amplification comprising the steps of providing a length of low-loss optical fiber having an input end and an output end;

applying a light beam at a pump wavelength $\lambda_1$ to said input end of said optical fiber of such an intensity that said output end of said fiber provides a first output beam at said pump wavelength $\lambda_1$ and a second output beam at a wavelength $\lambda_2$, where the intensity of said first output beam is much higher than the intensity of said second output beam; and applying a weak modulated optical signal at said wavelength $\lambda_2$ to said input end of said optical fiber, whereby said optical fiber, at said output end, provides a significantly modulated large-power light beam at said pump wavelength $\lambda_1$.

* * * * *